United States Patent

VanWyk

[11] 3,938,868
[45] Feb. 17, 1976

[54] BEARING LUBRICATION SYSTEM
[75] Inventor: Jan W. VanWyk, Kirkland, Wash.
[73] Assignee: The Boeing Company, Seattle, Wash.
[22] Filed: Sept. 23, 1974
[21] Appl. No.: 508,072

[52] U.S. Cl. ............ 308/239; 308/240; 308/DIG. 9
[51] Int. Cl.² ......................................... F16C 33/10
[58] Field of Search . 308/239, 240, DIG. 8, DIG. 9, 308/78; 184/1 E, 98, 99

[56] References Cited
UNITED STATES PATENTS

| | | | |
|---|---|---|---|
| 1,936,894 | 11/1933 | Whiteley | 308/240 |
| 3,206,264 | 9/1965 | Dalzell et al. | 308/240 |
| 3,428,374 | 2/1969 | Orkin et al. | 308/240 X |
| 3,590,957 | 7/1971 | Campbell et al. | 308/240 X |

FOREIGN PATENTS OR APPLICATIONS

| | | | |
|---|---|---|---|
| 656,616 | 1/1938 | Germany | 308/239 |
| 779,243 | 7/1957 | United Kingdom | 308/DIG. 9 |

Primary Examiner—Robert J. Spar
Assistant Examiner—Randolph A. Reese
Attorney, Agent, or Firm—Brown, Murray, Flick & Peckham

[57] ABSTRACT

A bearing construction is provided having a temperature responsive lubrication system. The invention is particularly applicable to bearings having hard, wear resistant bearing surfaces, such as ceramic surfaces, lubricated by solid lubricants placed in reservoirs in the bearing surface. Preferably, expansion members or plugs of material of higher thermal expansivity than the bearing material are placed in the reservoirs under the lubricant. Upon heating of the bearing due to friction or wear of the bearing surfaces, the lubricant expands out of the reservoirs onto the bearing surface to form a lubricant film and reduce the friction.

10 Claims, 3 Drawing Figures

BEARING LUBRICATION SYSTEM

The invention herein described was made in the course of or under a contract, or subcontract thereunder, with the Department of Defense.

BACKGROUND OF THE INVENTION

The present invention relates to bearings having hard, wear resistant surfaces such as ceramic bearings, and more particularly to an improved lubrication system for such bearings.

The invention is particularly suitable for oscillatory bearings such as airframe bearings used, for example, in aircraft and hydrofoils for control surface pivotal bearings and similar purposes, although this invention is equally applicable to other types of bearings where similar operating conditions may exist. Such bearings are subject to oscillatory operation under loads which in many cases are very high and which may be either unidirectional or reversing. Since the loads frequently exceed the capability of anti-friction bearings, plain slider bearings are usually used, and in many cases the bearings are subject to misalignment during operation making it necessary to use spherical or self-aligning types of slider bearings.

Bearings for this type of service preferably have hard, wear resistant bearing surfaces and ceramic materials are very desirable for this purpose because of their relatively inert characteristics, high hardness and ability to be machined to a smooth surface. Ceramic materials or other such hard materials, however, require lubrication to reduce friction and to eliminate or minimize wear between engaging surfaces. Solid lubricants are very suitable for this purpose and a thin film of lubricant coated on the engaging surfaces results in very low friction and can substantially eliminate wear. The life of such a thin film, however, is of relatively short duration and since an oscillatory bearing does not inherently distribute lubricant over the bearing surfaces in the manner of a continuously rotating bearing, means must be provided for maintaining the necessary lubrication between the engaging bearing surfaces.

In some conventional slider bearing designs, a lubricant liner has been utilized made of a lubricant such as polytetrafluoroethylene (TEFLON) fabric, or other material having similar lubricating properties. The load capacity of such bearings is severely limited, however, by the compressive strength of the liner material. Such liners are also subject to rapid wear and in many cases the wear rate is greater than can be permitted. Bearings have also been proposed in which lubricant is supplied in response to heating caused by friction as shown, for example, in patents to Vigne U.S. Pat. No. 1,941,768, Dalzell et al. U.S. Pat. No. 3,206,264 and Campbell et al. U.S. Pat. No. 3,509,957. These systems, however, all utilize fusible or metallic lubricant materials and are not suitable for the type of bearing applications to which the present invention is directed.

SUMMARY OF THE INVENTION

The present invention provides a temperature responsive lubricant system for bearings of the type discussed above; that is, bearings having engaging surfaces of hard, wear resistant material which require a lubricant film to be maintained between the engaging surfaces to keep friction and wear as low as possible.

In accordance with the invention, a slider type bearing is provided having engaging, relatively movable bearing surfaces which are made of a hard, wear resistant material such as ceramic although any suitable material having similar characteristics may, of course, be utilized. A plurality of lubricant reservoirs are provided in at least one of the engaging bearing surfaces, the reservoirs opening to the bearing surface and a substantial number of such reservoirs being distributed over the surface. A suitable solid lubricant, such as molybdenum disulfide or graphite, is placed in each of the reservoirs. Preferably, an expansion member or plug of a material having higher thermal expansivity than the bearing material is placed in each lubricant reservoir underneath the lubricant. As the lubricating film between the bearing surfaces wears away and disappears, the resulting increase in friction raises the temperature of the bearing material and heats the lubricant and expansion member, which causes the lubricant to expand or be forced out of the reservoirs onto the surface of the bearing. The lubricant film is thus replenished and friction and wear are reduced to acceptable levels. In this way, adequate lubrication can be maintained even for slider type bearings in oscillatory service under very heavy loads.

BRIEF DESCRIPTION OF THE DRAWINGS

The invention will be more fully understood from the following detailed description, taken in connection with the accompanying drawing, in which.

DESCRIPTION OF THE PREFERRED EMBODIMENT

As previously discussed, the present invention is particularly intended for slider bearings for oscillatory service under heavy load, and relates particularly to an improved lubrication system for such bearings.

Figure 1:
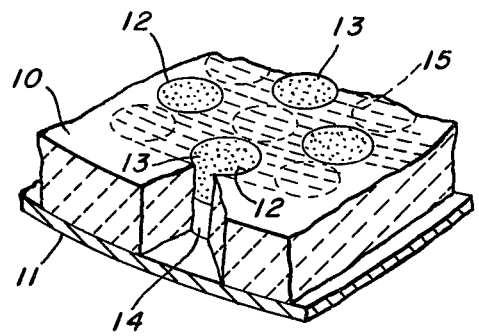
FIG. 1 is a fragmentary, somewhat diagrammatic perspective view of a portion of a bearing member embodying the invention.

The principle of the present invention is illustrated in FIG. 1 which shows a portion of a bearing member. The bearing member of FIG. 1 has a bearing surface 10 made of a hard, wear resistant material such as ceramic which may be supported on a steel outer shell 11, or other suitable support, and which is adapted to engage a cooperating bearing surface (not shown). A plurality of lubricant reservoirs 12 are provided in the bearing surface 10. Each of the reservoirs 12 is shown as a generally cylindrical recess open to the bearing surface and extending a substantial depth into the bearing member to provide adequate lubricant capacity. A solid lubricant 13 of any suitable type is placed in each of the reservoirs 12 to supply lubricant to the bearing surface 10. In order to insure operation in the desired manner, an expansion member 14 is placed in each bearing reservoir 12 under the lubricant which fills the reservoir. The expansion members 14 may be in the form of plugs, as shown in FIG. 1, filling the reservoirs under the lubricant and are made of a material having a higher coefficient of thermal expansion than that of the lubricant and of the material of the bearing surface 10.

In the operation of this structure, assuming the bearing surface 10 to be in engagement with another relatively movable bearing surface and subjected to load, it will be apparent that if there is inadequate lubrication between the engaging surfaces, the relatively high friction will generate sufficient heat to substantially raise the temperature of the bearing surface 10. The temperature of the expansion members 14 and of the lubricant 13 will, of course, also be raised by thermal conduction from the bearing material. Since the expansion members have higher thermal expansivities than the bearing material, they will expand sufficiently to force some of the lubricant 13 out of the reservoirs onto the bearing surface 10 where it will be spread out as indicated at 15 by the relative movement of the bearing surface 10 and the surface which it engages. A film of lubricant is thus formed between the engaging surfaces which reduces the friction and heating and permits the bearing surfaces to cool, stopping further supply of lubricant from the reservoirs. The film of lubricant between the engaging surfaces reduces friction and wear to low levels for some period of time until the thin film begins to wear away. As this occurs, the friction and heating increase and the process described above is repeated to reestablish the lubricating film. In this way, adequate lubrication is maintained and excessive friction and wear are prevented.

The invention can, of course, be applied to bearings of any suitable type or construction. A ceramic slider bearing of the self-aligning type embodying the invention is shown by way of example in FIG. 2. The bearing there shown has an inner member including a steel shell or sleeve 20 which is shown as being made in two parts bonded together after assembly, to facilitate manufacture, and which is adapted to be pressed or otherwise secured on an oscillatory shaft. A bearing member 21 having a spherical outer surface is carried by the inner sleeve 20 and may be secured to it by a suitable adhesive 22 such as an epoxy resin, or other suitable bonding agent. The bearing member 21 may be made of any suitable material to provide a bearing surface which is hard and wear resistant. The member 21 is preferably made of a ceramic material having these characteristics such as alumina ($Al_2O_3$) or silicon nitride ($Si_3N_4$). Both of these materials are capable of being finely ground and molded to a desired size and shape with a suitable binder, if desired, and then sintered or fired at a relatively high temperature to form a hard ceramic product. These or similar materials may be used and can be molded or machined to fit the inner sleeve 20 with the bearing surface ground or otherwise finished to an accurate spherical configuration.

Figure 2:
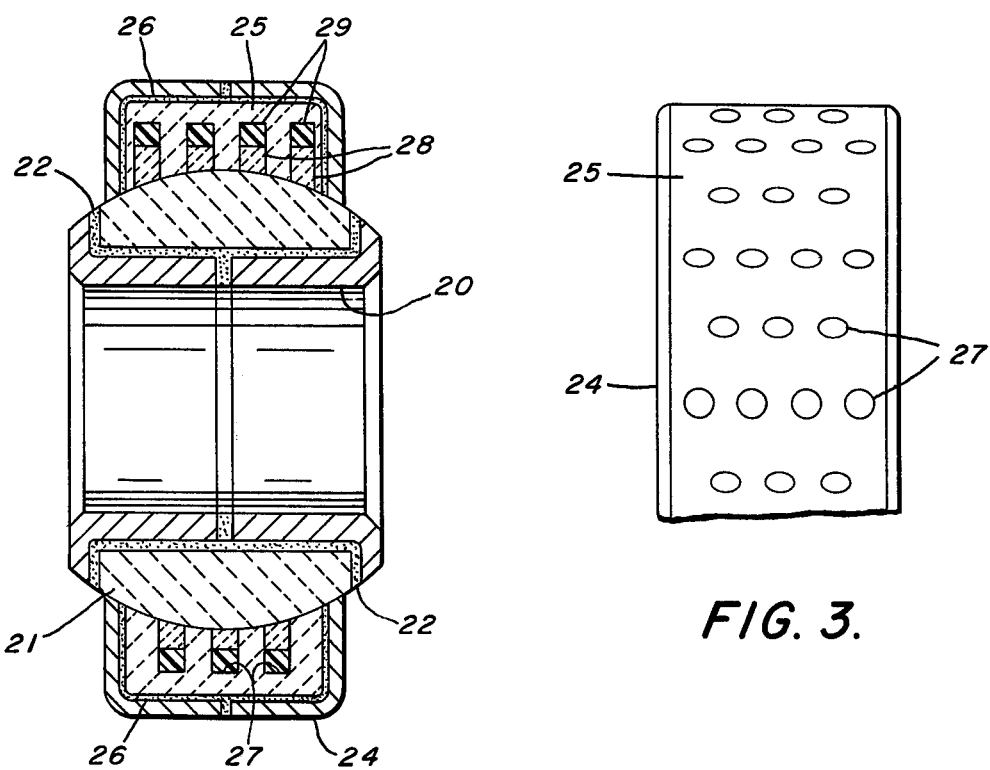
FIG. 2 is a longitudinal sectional view of a bearing in accordance with the present invention.
Figure 3:
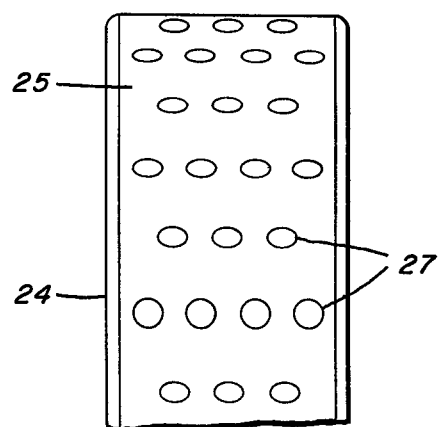
FIG. 3 is a fragmentary elevational view of the bearing surface of the outer bearing member of FIG. 2.

The outer member of the bearing of FIG. 2 has a steel shell 24 which is also shown as being made in two halves bonded together to facilitate manufacture. A generally annular bearing member 25 is mounted in the shell 24 and bonded to it by an adhesive 26. The member 25 has a spherical inner surface conforming to the outer surface of the bearing member 21, and is preferably made of the same material as the member 21, or of a similar material having the same characteristics. As shown in FIGS. 2 and 3, the bearing member 25 has a substantial number of cylindrical recesses 27 molded or otherwise formed in it and opening to the spherical surface to constitute lubricant reservoirs. A relatively large number of these reservoirs may be provided, preferably distributed in a pattern over the entire bearing surface which will result in a transfer of lubricant that will cover the entire engaging surface, as shown in FIG. 3. The bearing reservoirs 27 each contain a solid lubricant material 28 and preferably also an expansion member or plug 29. As previously described, the solid lubricant 28 may have a higher coefficient of thermal expansion than the material of the bearing member 25, and the expansion member 29 has a still higher coefficient of thermal expansion to insure a large amount of expansion relative to the member 25 when heated.

Any suitable solid lubricant capable of expanding out of the reservoirs and providing effective lubrication may be utilized. A preferred material which has been found to give highly satisfactory results in molybdenum disulfide ($MoS_2$) which may be utilized in the form of a metal-bonded material or composite. Thus, for example, one satisfactory material is a composition containing 90% molybdenum disulfide bonded in a metal matrix consisting of 8% molybdenum and 2% tantalum by weight, and it is to be understood that the terms molybdenum disulfide and solid lubricant, as used herein, include such metal-bonded materials. Other suitable solid lubricants which have given good results are graphite and polytetrafluoroethylene.

In order to insure proper operation, as previously described, it is preferred in most cases to provide an expansion member of much higher coefficient of expansion than the bearing member under the solid lubricant to insure that the lubricant will be positively forced out of the reservoir in response to temperature rise of the bearing material. Any suitable material can be used for this purpose which has good thermal conductivity and a coefficient of thermal expansion substantially higher than that of the bearing itself. Ceramic bearing materials, for example, have quite low expansion coefficients of the order of $4 \times 10^{-6}$ in./in./°F, and any material with a substantially higher coefficient and good thermal conductivity could be used. Many organic polymers such as the polyolefins meet the requirements and can be used. A preferred material which has been found to give good results is polyethylene which can readily be molded into small plugs to fit the lubricant reservoirs and which has relatively high thermal expansivity of approximately $11 \times 10^{-5}$ in.-/in./°F. Silicone rubber with a coefficient of $30 \times 10^{-5}$ is another suitable material having the required characteristics and readily moldable to the desired size and shape.

In operation, the bearing of FIG. 2 operates in the manner described above in connection with FIG. 1. That is, as the lubricant film between the engaging bearing surfaces wears away, the friction increases and heats the material of the bearing member 25. This increase in temperature causes expansion of the expansion members 29, and the lubricant 28, and the lubricant is forced out of the reservoirs onto the bearing surface. The relative movement of the bearing surfaces spreads the lubricant and a film of lubricant is thus formed between the bearing surfaces. The lubricant is supplied from the numerous bearing reservoirs provided over the entire surface of the member 25 so that the film is formed quite rapidly and an adequate supply of lubricant is provided. The lubricant film thus formed, or renewed, immediately reduces the friction to a low value, reducing the amount of heat generated and permitting the bearing members to cool so that the expansion members 29 tend to contract and cease to supply lubricant to the bearing film. The friction and wear between the bearing surfaces are thus kept at acceptable levels. The lubricant film is, of course, very thin so that it tends to wear and will disappear in some period of time. As this occurs, however, the friction and heating will increase and the process described above is repeated, resulting in the formation of a renewed lubricant film. Proper lubrication with low friction and wear is thus maintained.

It will now be apparent that a temperature sensitive lubrication system has been provided for bearings of the slider type having hard, wear resistant bearing surfaces. The invention is particularly suitable for bearings for such uses as airframe bearings where the bearing is used in oscillatory service with high loads, and it is particularly suitable for ceramic bearings. It will be understood, however, that the invention is not limited to the use of any specific materials since the bearing surfaces can be made of any wear resistant material, such as tool steel, for example, or other hard materials. The bearing members might also be made of a suitable metal such as steel or titanium with the bearing surface coated with a ceramic material. Similarly, certain specific lubricant materials have been mentioned, but any suitable solid lubricant could be utilized which has the necessary characteristics. The use of the high expansivity plug or expansion member under the lubricant in the reservoirs insures an adequate supply of lubricant to the bearing surfaces in response to heating of the bearing material and any suitable material capable of providing this function could be used. The lubricant reservoirs have been shown as cylindrical recesses in the bearing surface, which is the preferred configuration, but other shapes such as square or rectangular recesses or slots could be used.

I claim as my invention:

1. A bearing structure including relatively movable members having engaging bearing surfaces, one of said members having a plurality of lubricant reservoirs therein opening to the bearing surface, a solid lubricant material contained in each of said reservoirs, said solid lubricant having a coefficient of thermal expansion greater than the material of said one bearing member, and expansion members in said reservoirs under the lubricant, said expansion members having a higher coefficient of thermal expansion than the bearing material.

2. A bearing structure as defined in claim 1 in which said solid lubricant is selected from the group consisting of molybdenum disulfide, graphite and polytetrafluoroethylene.

3. A bearing structure as defined in claim 2 in which said expansion members are made of a material selected from the group consisting of polyethylene and silicone rubber.

4. A bearing structure as defined in claim 1 in which at least one of said bearing surfaces is made of a ceramic material.

5. A bearing structure as defined in claim 4 in which said ceramic material is selected from the group consisting of alumina and silicon nitride.

6. A bearing structure comprising inner and outer bearing members adapted for relative rotational movement, said members having engaging bearing surfaces of hard, wear resistant material, one of said surfaces having a plurality of recesses extending therethrough into the bearing member, a solid lubricant in each of said recesses comprising a material having a higher coefficient of thermal expansion than the bearing member, and an expansion member disposed in the bottom of each of said recesses under said solid lubricant, said expansion members being made of a material having a higher coefficient of thermal expansion than the bearing material.

7. A bearing structure as defined in claim 6 in which at least one of said bearing surfaces is a ceramic material.

8. A bearing structure as defined in claim 7 in which said ceramic material is selected from the group consisting of alumina and silicon nitride, and said solid lubricant is selected from the group consisting of molybdenum disulfide, graphite, and polytetrafluoroethylene.

9. A bearing structure comprising relatively movable bearing members having engaging bearing surfaces of hard, wear resistant material, one of said members having a plurality of recesses therein opening to the bearing surface, an expansion member disposed in the bottom of each of said recesses, said expansion members being made of a material having a higher coefficient of thermal expansion than the material of said bearing members, and each of said recesses containing a solid lubricant material above the expansion member.

10. A bearing structure as defined in claim 9 in which said bearing surfaces consist of a ceramic material and said solid lubricant is selected from the group consisting of molybdenum disulfide, graphite and polytetrafluoroethylene.

* * * * *